UNITED STATES PATENT OFFICE.

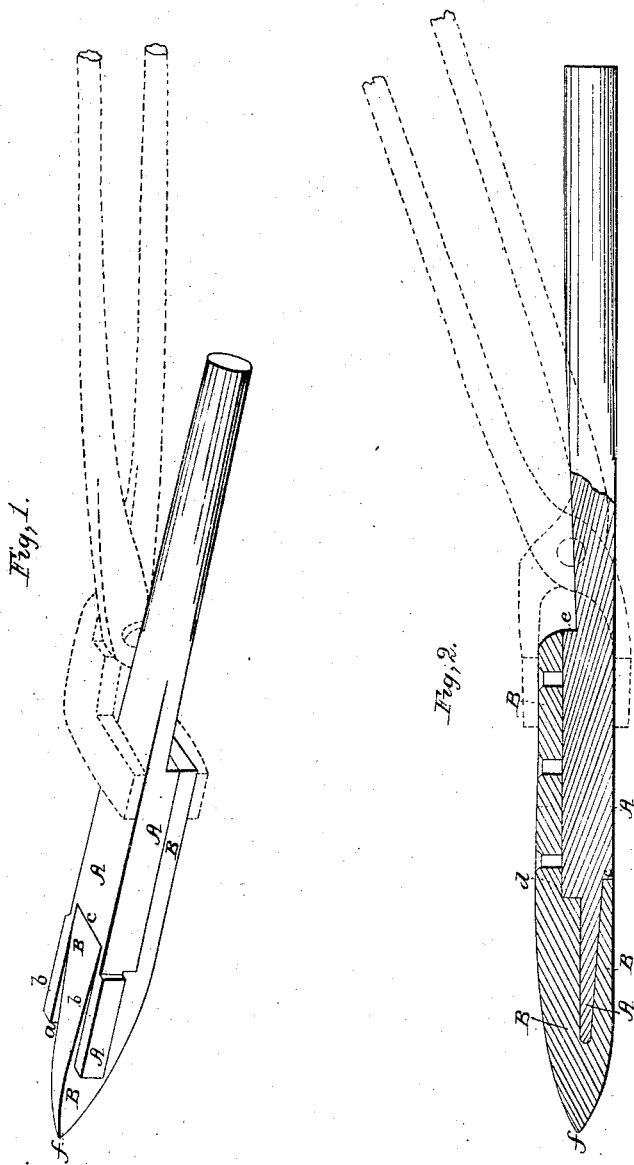

LEWIS MILLER, OF CANTON, OHIO.

MAKING FINGER-GUARDS FOR HARVESTERS.

Specification of Letters Patent No. 31,285, dated January 29, 1861.

*To all whom it may concern:*

Be it known that I, LEWIS MILLER, of Canton, in the county of Stark and State of Ohio, have invented a new and useful Tool for Forging, Shaping, or Truing the Fingers or Guards of Harvesting-Machines Upon; and I do hereby declare the following to be a full, clear, and exact description of the construction and operation of the same, reference being had to the accompanying drawings, making a part of this specification, in which—

Figure 1, represents a perspective view of the tool in question, with a finger or guard upon it as in course of construction. Fig. 2, represents a longitudinal section through the shaping tool or die, and guard, the tongs being shown in red, in both figures.

Similar letters of reference where they occur in both figures, denote like parts of the tool and guard in both drawings.

In the making of guards for harvesters it is necessary that, every part of the guard should be formed with exactness in regard to the others that are to form the series, so that when placed on the finger bar, they shall have uniform lines, particularly where the cutter bar, and the cutters are to be supported, and vibrate past them. When guards are cast in a mold they are of necessity uniform in shape and dimensions, but when made of wrought iron, or wrought iron and steel, it is very difficult without a shaping tool, to preserve this uniformity. And as these guards sometimes break, or get bent others have to be substituted for them, and the new ones must conform exactly to the old ones, else there will be cramping or friction upon the cutters or the cutter bar. It is important also that this shaping tool should be portable, easily handled, and so made as to hold the finger or guard in place when a heat is to be taken on the blank, or unfinished guard, and be readily turned, and firmly lie on the anvil while being wrought into proper shape.

My invention consists in a portable shaping tool in or on which the blank or unfinished guard may be heated and wrought into its proper shape, said guard during the process of its formation being clamped or held to the shaping tool by tongs or clamps so that it may be readily handled and firmly lie upon the block or anvil while being put into proper shape.

To enable others skilled in the art to make and use my invention I will proceed to describe the same with reference to the drawings.

A represents that part of the shaping tool or die in which the forms, in reverse, of what the finished guard is to possess, are made, it having a beveled or inclined recess $a$, to form the cap portion of the guard in, and flanges $b$ to define its width, and a shoulder $c$ to designate its length. On the other side of the former or tool, is a shoulder $d$ against which the cutter bar, or an auxiliary bar for the cutter bar to move against is placed, and another shoulder $e$ for designating the length of the heel of the guard, the point $f$ being shaped on the anvil, while the guard is clamped to the forming tool by tongs or handles, that admit of its being readily handled, turned, or heated.

B, represents the guard as clamped, and shaped to the die or former A, the shoulders or recesses of said guard being formed against or by the shoulders and recesses in the shaping tool.

The advantage of the portable shaping tool is this, that the guard may be carried to the fire to be heated while held to the die by the clamps, which saves the removal of it by other means as is necessary when the shaping die is a fixture. The clamps or handles are shown in red.

Having thus fully described the construction and use of my shaping or truing tool, what I claim therein as new and desire to secure by Letters Patent is—

A portable shaping or truing tool, having the forms of a harvester guard or finger in reverse upon it, and in or to which said guard may be clamped by tongs or handles, while being carried to be heated; formed, or wrought into shape, to be easily handled, substantially as described.

LEWIS MILLER.

Witnesses:
JOSEPH FOLASE,
A. C. HANGER.